United States Patent [19]

Attix

[11] 4,313,797

[45] Feb. 2, 1982

[54] GUIDE TUBE SLEEVE

[75] Inventor: Douglas J. Attix, Forest, Va.

[73] Assignee: The Babcock & Wilcox Company, New Orleans, La.

[21] Appl. No.: 77,257

[22] Filed: Sep. 19, 1979

[51] Int. Cl.³ .............................................. G21C 3/30
[52] U.S. Cl. .................................. 376/441; 376/446; 376/439
[58] Field of Search ................................... 176/76, 78

[56] References Cited

U.S. PATENT DOCUMENTS

| | | | |
|---|---|---|---|
| 3,787,286 | 1/1974 | Anthony | 176/78 |
| 3,933,584 | 1/1976 | Litt | 176/78 |
| 4,175,004 | 11/1979 | Jabsen | 176/78 |

Primary Examiner—Donald P. Walsh
Attorney, Agent, or Firm—Robert J. Edwards; Robert H. Kelly

[57] ABSTRACT

A nuclear fuel assembly including a guide tube sleeve having tabs projecting outwardly from the sleeve to modify coolant flow.

5 Claims, 10 Drawing Figures

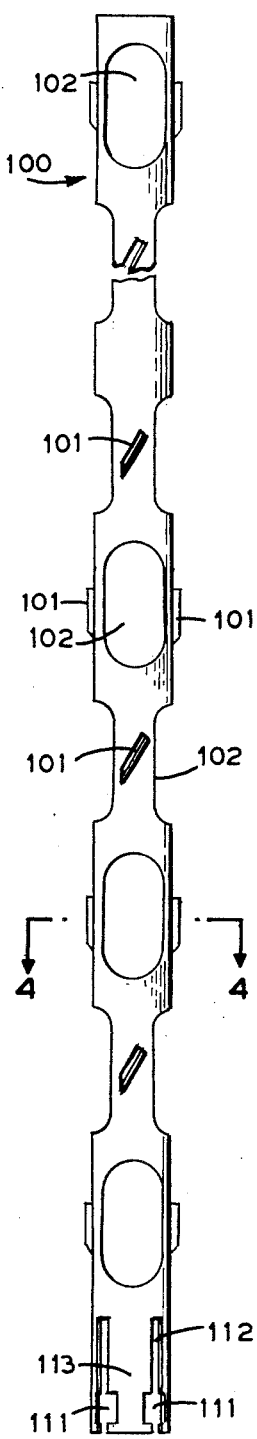
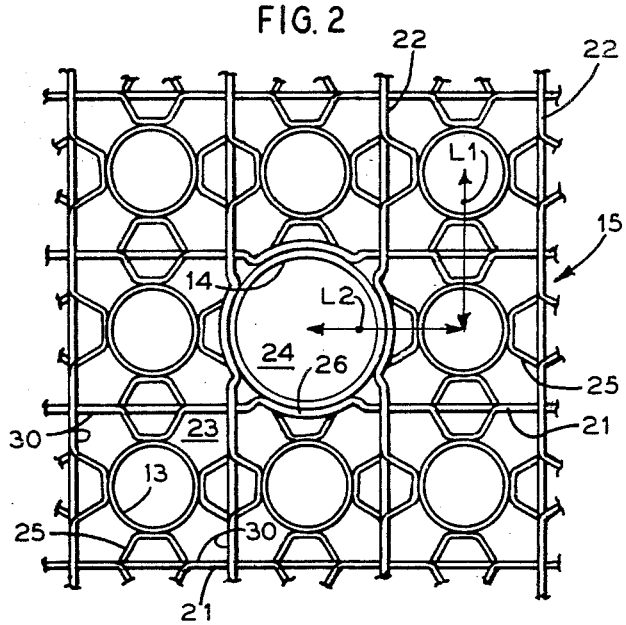
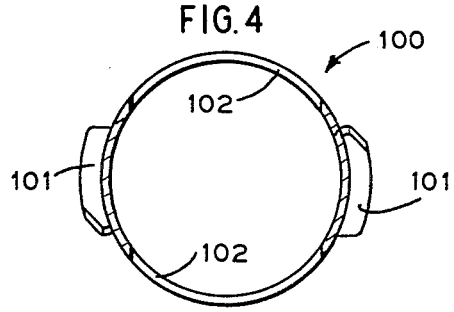
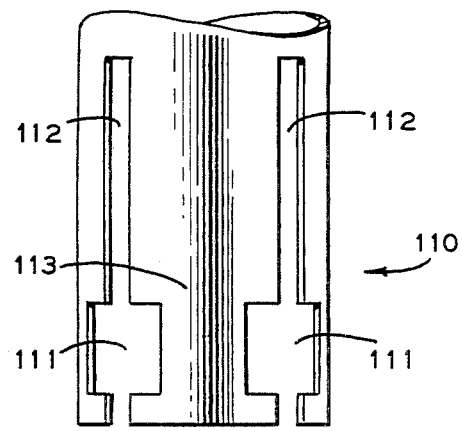

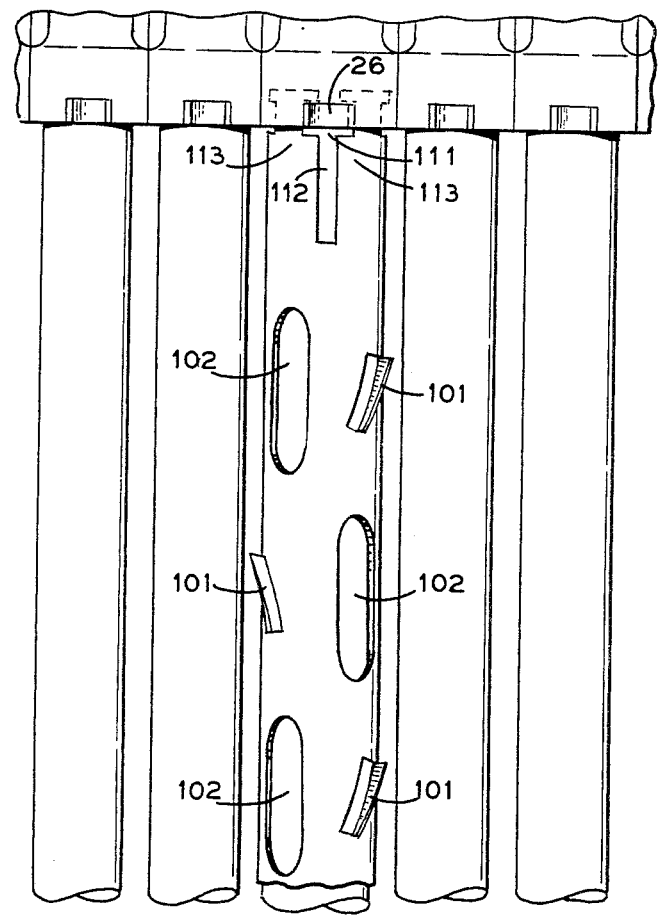
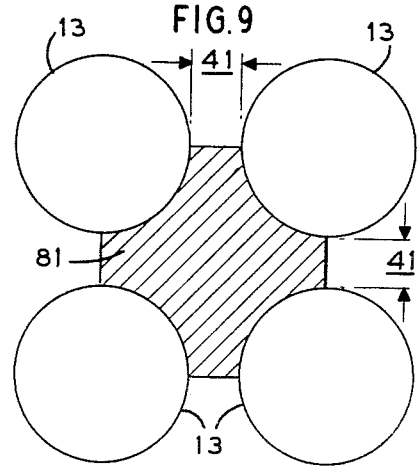
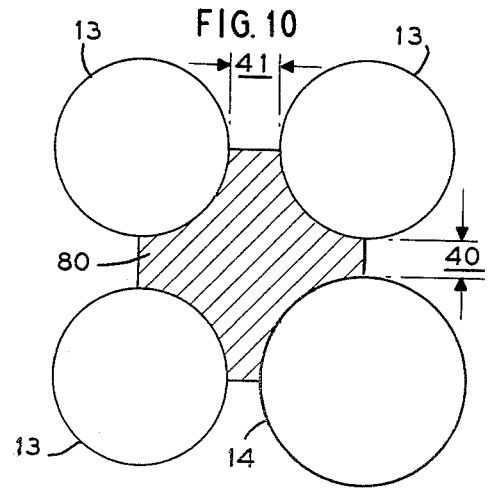

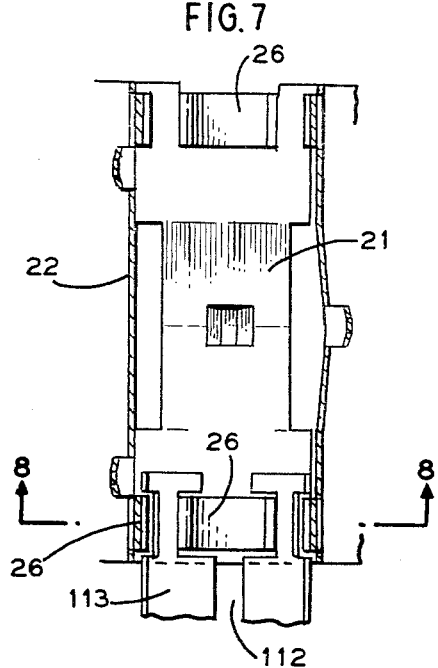
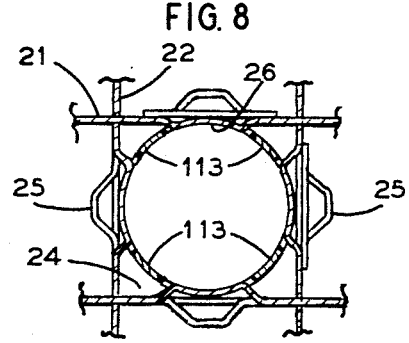

GUIDE TUBE SLEEVE

TECHNICAL FIELD

This invention relates to fuel assemblies for nuclear reactors and, more particularly, to a sleeve disposed in surrounding relationship to non-fuel bearing members in the fuel assembly.

BACKGROUND ART

In water-cooled nuclear reactors, the reactor core in which the fission chain is sustained generally contains a multiplicity of fuel assemblies. These fuel assemblies are mechanically identical and interchangeable, each being designed to maintain its own structural integrity.

A fuel assembly typically contains, among other things, a plurality of longitudinally extending parallel members, some bearing fuel and some not bearing fuel. The parallel members are supported vertically by end fittings. Lateral bracing and spacing of the members are provided by spacer grids which contain a plurality of cellular voids. The spacer grids are disposed across the parallel members so that each parallel member extends through one cellular void per grid. The spaces between adjacent members create flow channels through which is circulated water, flowing from bottom to top.

Most of the parallel members contain fuel and are known as fuel rods. The non-fuel bearing members are hollow and comprise an instrument tube and a plurality of guide tubes. The instrument tube accommodates various monitoring devices. The guide tubes are used to receive control rods which regulate the fissioning activity, and hence the generation of heat. Henceforth unless otherwise indicated, the term guide tube will be used to denote instrument tubes as well as guide tubes.

The guide tubes have a larger diameter than the fuel rods. Because of this difference in diameter and because all the cellular voids of the spacer grid have equal center-to-center distances, the flow channel between a guide tube and an adjacent fuel rod has a smaller cross-sectional area than the flow channel between two adjacent fuel rods. This difference in flow channel space affects the flow of water, there being more flow in the wider space between two adjacent fuel rods.

Water flow, in turn, affects the rate of heat transfer from the fuel to the water, a greater flow providing for a greater heat transfer. Since heat transfer rate is a factor affecting the maximum operating conditions (and hence the energy producing capability) of the reactor, the flow of water in the flow channel between a guide tube and an adjacent fuel rod is a limiting factor in the operation of the reactor.

SUMMARY OF THE INVENTION

The disclosed invention increases the operating capacity of a nuclear reactor by causing a modification in the flow pattern of the coolant which enhances the coolant's effectiveness.

The apparatus provides a thin-walled tubular sleeve closely surrounding but not attached to the exterior surface of a guide tube in a fuel assembly. The wall of the sleeve has tabs projecting outwardly into adjacent flow channels. The sleeve is attached to the wall of a cellular void through which passes the guide tube associated with said sleeve.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the accompanying drawings, forming a part of this specification, and in which reference numerals shown in the drawings designate like or corresponding parts throughout the same.

FIG. 2 is a plan view of a portion of a spacer grid assembly;

FIG. 3 is an elevation view of a guide tube sleeve;

FIG. 4 is a sectional view taken on line 4—4 in FIG. 3;

FIG. 5 is an elevation view of the notched-slot end of a guide tube sleeve;

FIG. 6 is an elevation view of part of several parallel members of a fuel assembly extending through a spacer grid, including a sleeve surrounding a guide tube;

FIG. 7 is an elevation view showing a cross-section of a cellular void with the guide tube sleeve in position;

FIG. 8 is a sectional view taken on line 8—8 in FIG. 7;

FIG. 9 is a schematic representation of a flow channel (illustrated by the shaded area) defined by four fuel rods;

FIG. 10 is a schematic representation of a flow channel (illustrated by the shaded area) defined by three fuel rods and a guide tube.

BEST MODE FOR CARRYING OUT THE INVENTION

Figure 1:
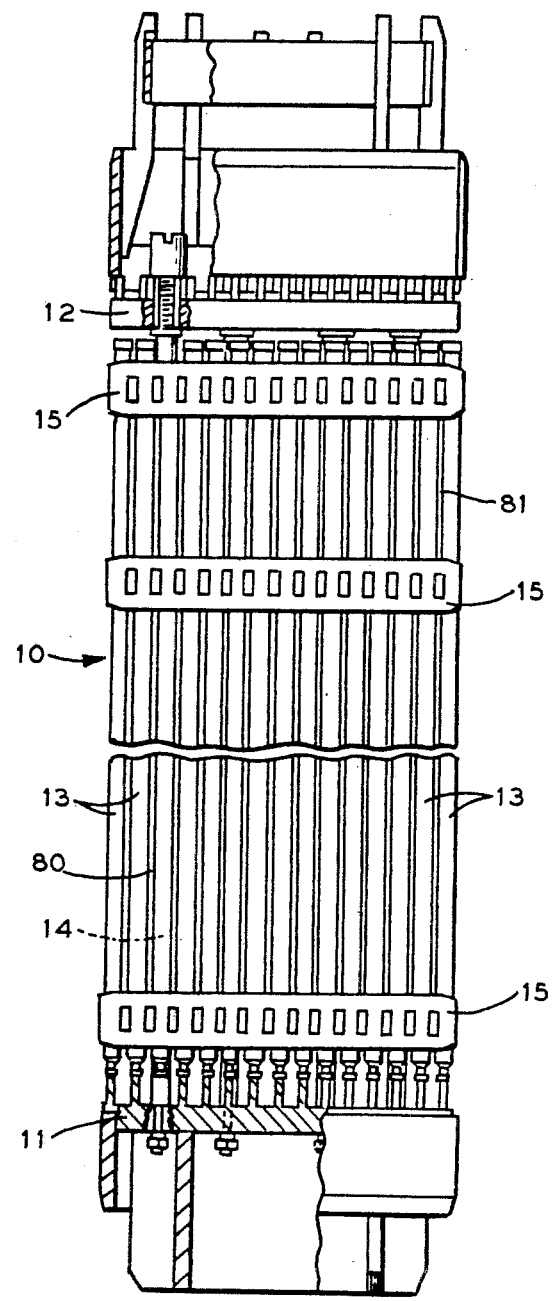
FIG. 1 is an elevation view, partly broken away and partly in section, of a fuel assembly.

FIG. 1 illustrates a fuel assembly 10, oriented with its longitudinal axis in the vertical plane. Said assembly has a lower end fitting 11 and an upper end fitting 12, vertically supporting a plurality of longitudinally extending parallel members, including fuel rods 13, guide tubes 14 and an instrument tube (not shown). The fuel rods 13 and guide tubes 14 are laterally braced and spaced by spacer grids 15.

As shown in FIG. 2, each spacer grid is made of a plurality of grid plates 21 and 22 which are slotted and fitted together in "egg-crate" fashion. The intersecting grid plates form a plurality of cellular voids, each void accommodating the extension therethrough of a parallel member. Cellular void 23 accommodates a fuel rod 13 while cellular void 24 accommodates a guide tube 14. Because the fuel assembly 10 typically contains more fuel rods than guide tubes, spacer grid 15 contains more voids 23 than voids 24, a single void 24 being surrounded by a plurality of voids 23.

Each cellular void has four walls, said walls being comprised of those sections of intersecting grid plates which define and face the void. For example, FIG. 2 shows the walls 30 of cellular void 23. The walls of void 23 contain appendages, like indentations 25, which engage and support the fuel rod 13. The walls of cellular void 24 have appendages, like indentations 26, which are called saddles. As shown, the saddles 26 have a concave surface to accommodate the cylindrical guide tube. Note that the guide tube 14 has a larger diameter than the fuel rod 13, this difference in size being responsible for the different configuration of void 23 vis-a-vis void 24. Despite this difference in configuration, the center-to-center distance $L_1$ between adjacent voids accommodating fuel rods is equal to the center-to-center distance $L_2$ between a void accommodating a guide tube and an adjacent void accommodating a fuel rod.

FIGS. 3 and 4 illustrate guide tube sleeve 100, including deflecting tabs 101 and openings 102. Tabs 101 are made of rectangular segments of the sleeve wall which are folded outwardly. Openings 102 accommodate tab-making tools, thus facilitating the formation of said tabs.

FIGS. 3 and 5 illustrate notched-slot 110 which is a square shaped notch 111 superimposed over a slot 112. That part of the sleeve between two adjacent slots is called a finger 113. The notched-slot 110 is located at either end of the sleeve 100, and is used to anchor the sleeve to a spacer grid as illustrated in FIGS. 6, 7 and 8. Slots 112 give the fingers 113 a measure of flexibility. To install the sleeve, the fingers 113 are flexed inwardly slightly while the notched-slot end of the sleeve is pushed into void 24. The sleeve is pushed into the void 24 until the notch 111 fully surrounds a saddle 26, as shown in FIGS. 6 & 7. In the engaged position, each corner of void 24 accommodates the top of a finger 113, as shown in FIG. 8. Secured in this manner, vertical, horizontal and rotational movement of the sleeve is precluded. For purposes of clarification, it should be noted that FIG. 2 shows a guide tube without its surrounding sleeve while FIG. 8 shows a sleeve without its surrounded guide tube.

Each sleeve, except for the notched-slot end extending partway into the supporting spacer grid, is no longer than the vertical distance between two adjacent spacer grids. There may be more than one sleeve per guide tube, each sleeve being disposed between a pair of adjacent spacer grids. Therefore, if desired, a guide tube may be covered throughout its entire length by a series of sleeves arranged end-to-end.

FIG. 1 illustrates longitudinal flow channels 80 and 81, being the space between adjacent parallel members. A coolant, usually water, is circulated through the flow channels, the coolant usually entering from the b 5 of the fuel assembly and exiting at the top of said assembly. The size of the flow channel depends upon the type of members which define said channel. For example, in FIG. 9, the cross-sectional area of flow channel 81 is defined by 4 adjacent fuel rods 13.

Contrast the size of flow channel 81 to the size of flow channel 80 shown in FIG. 10. Flow channel 80 is defined by 3 fuel rods 13 and a guide tube 14. Because the diameter of the guide tube is larger than that of the fuel rod, and because all the cellular voids of the spacer grid have equal center-to-center distances, the size of channel 80 is smaller than that of 81. This difference in size affects the flow of coolant, there being more flow in channel 81 than in channel 80.

Coolant flow is also affected by gap size. Gap size is the shortest distance between two adjacent parallel members. In FIG. 9, the gap between two fuel rods is designated by numeral 41. In FIG. 10, the gap designated by numeral 40 is the distance between a fuel rod 13 and a guide tube 14. Gap 40 is smaller than gap 41 for the same reasons given above concerning the relative sizes of flow channels 81 and 80.

Because of this difference in gap size, there will be more coolant flow through gap 41 than through gap 40.

The tabs 101 projecting from sleeve 100 serve to increase the rate of coolant flow through tap 40 and through flow channel 80. The tabs also serve to otherwise modify the flow of coolant, causing a mixing action in the immediate area surrounding the guide tubes. The increased rate of coolant flow as well as the mixing action results in an increased heat transfer rate and a general enhancement of the coolant's effectiveness thereby increasing the operating capacity of the reactor.

FIG. 3 shows the preferred embodiment of tab 101, that being a flat tab inclined 30° from the vertical. FIG. 6 shows an alternative embodiment of tab 101, said tab having a slight twist.

While in accordance with the provisions of the statutes, there is illustrated and described herein a specific embodiment of the invention, those skilled in the art will understand that changes may be made in the form of the invention covered by the claims and that certain features of the invention may sometimes be used to advantage without a corresponding use of the other features.

I claim:

1. A fuel assembly for a nuclear reactor comprising:
   a. a plurality of longitudinally extending parallel members including fuel bearing parallel members and non-fuel bearing parallel members;
   b. at least one spacer grid disposed transversely across the parallel members, said grid having a plurality of cellular voids for accommodating the extension of members therethrough, said grid keeping adjacent members apart so as to create longitudinal flow channels between members;
   c. a coolant passing through the channels;
   d. a plurality of thin-walled tubular sleeves attached to the walls of cellular voids having non-fuel bearing members extending therethrough, the sleeves being disposed in surrounding relationship to the non-fuel bearing members; and
   e. tabs projecting outwardly from the sleeves into adjacent flow channels to increase the flow of coolant therethrough and cause a mixing action in the coolant.

2. The apparatus of claim 1 wherein the means of attaching each sleeve to the wall of the corresponding cellular void comprises at least one notched slot in one end of the sleeve and at least one cooperatively associated appendage on the wall of the cellular void, the appendage fitting into the notched slot thereby preventing sleeve movement.

3. The apparatus of claim 1 wherein the tabs are comprised of segments of the sleeve wall.

4. The apparatus of claim 3 wherein the sleeve contains a plurality of openings, each opening providing access to at least one tab, thereby facilitating the formation of the tabs.

5. The apparatus of claim 1 including a plurality of tubular sleeves associated with each non-fuel bearing member.

* * * * *

UNITED STATES PATENT AND TRADEMARK OFFICE
CERTIFICATE OF CORRECTION

PATENT NO. : 4,313,797

DATED : February 2, 1982

INVENTOR(S) : Douglas J. Attix

It is certified that error appears in the above-identified patent and that said Letters Patent are hereby corrected as shown below:

Column 3, line 42, delete "b5" and insert therefor --bottom--.

Signed and Sealed this

Sixth Day of July 1982

[SEAL]

Attest:

GERALD J. MOSSINGHOFF

Attesting Officer

Commissioner of Patents and Trademarks